Patented Jan. 17, 1950

2,494,862

UNITED STATES PATENT OFFICE 2,494,862

METHYLOL PHOSPHITES

W E Craig, Philadelphia, and William F. Hester, Drexel Hill, Pa., assignors to Rohm & Haas Company, Philadelphia, Pa., a corporation of Delaware No Drawing. Application August 7, 1947, Serial No. 767,317

3 Claims. (Cl. 260—461)

This invention relates to derivatives of esters of phosphorous acid having the formula, $$(RO)_2POCH_2OH$$

where R is a monovalent organic group free of hydrogen atoms which are reactive with aldehydes. The group R is preferably an aliphatic monovalent group containing not over twelve carbon atoms. It may be a hydrocarbon group, or it may be a group containing such substituents as thiocyano, cyano, nitro, or tertiary amino, or an ether group or a halogen, such as chlorine or bromine.

The compounds of this invention are useful as parasiticides and fungicides and as textile treating agents.

This application is a continuation-in-part of our application Serial No. 620,636, filed October 5, 1945, now Patent No. 2,485,573 wherein there are claimed the reaction products of di-substituted esters of phosphorous acid and aldehydes of two to eight carbon atoms. The present case deals with reaction products from such esters and formaldehyde or substances which yield formaldeyde, such as the revertible polymers of formaldehyde, formals, or the like. The new products thus obtained form an individual class because of the presence of a methylol group.

As is pointed out in our earlier-filed application, it is known that phosphorus trichloride reacts with compounds having an alcoholic hydroxyl group or a phenolic hydroxyl group to give normal esters of $H_3PO_3$, which may decompose in the presence of liberated hydrogen chloride to the acid ester, thus:

$$3ROH + PCl_3 \rightarrow (RO)_3P + 3HCl \rightarrow (RO)_2POH + RCl$$

It has been found that formaldehyde adds to these acid esters to form the compounds, $$(RO)_2POCH_2OH$$

The acid phosphite esters may be dialkyl esters, such as the dimethyl, diethyl, dibutyl, dioctyl, or didecyl esters, or they may be esters having cycloaliphatic, arylaliphatic, aryl, or heterocyclic groups. Representative of these are the dibenzyl di(phenoxyethyl)-, di(phenoxypropyl)-, di-tetrahydrofurfuryl, and the like. The ester groups may also comprise such substituents as chloroethyl, thiocyanoethoxyethyl, cyanobutyl, nitrobutyl, ethoxyethyl, butoxyethyl, allyl, methallyl, crotyl, cinnamyl, undecenyl, oleyl, bromopropoxypropyl, phenyl, cresyl, tert.-butylphenyl, isooctylphenyl, dihydronordicyclopentenyl, N,N-dimethylaminoethyl, N,N-dimethylaminoethoxyethyl, etc.

Typical diesters which may be used are:

$(C_2H_5O)_2POH$
$(C_4H_9O)_2POH$
$(C_6H_{11}O)_2POH$
$(C_6H_5CH_2O)_2POH$
$(C_2H_5OC_2H_4O)_2POH$
$(ClCH_2CH_2O)_2POH$
$((CH_3)_2C(NO_2)CH_2O)_2POH$
$(NCSCH_2CH_2OCH_2CH_2)_2POH$
$(BrCH_2CH_2OCH_2CH_2)_2POH$
$(C_6H_{13}(ClCH_2)CHO)_2POH$
$(C_6H_{13}(CH_3)CHO)_2POH$
$(C_{12}H_{25}O)_2POH$
$((CH_3)_2(CN)CO)_2POH$
$(C_6H_5O)_2POH$
$(C_8H_{17}O)_2POH$
$(CH_2=CH-CH_2O)_2POH$
$(2-ClC_6H_4CH_2O)_2POH$
$(4-ClC_6H_4CH_2O)_2POH$
$(ClC_6H_4O)_2POH$
$((CH_3)_2NCH_2CH_2O)_2POH$
$(2-Cl-4-NO_2C_6H_3O)_2POH$
$(4-iso-C_8H_{17}C_6H_4O)_2POH$
$(CH_3C_6H_4O)_2POH$
$(C_4H_9C_6H_4O)_2POH$ The diester and formaldehyde are reacted when mixed directly or in the presence of an organic solvent. The formaldehyde may be supplied from a revertible polymer such as paraformaldehyde, as a gas, or from an unstable compound containing an available methylene group as in formals, or the like. The reaction starts even below room temperature in many cases and can be accelerated or carried toward completion by raising the temperature. Temperatures of 20° to 60° C. are to be preferred, and, since formaldehyde can be readily driven off with rising temperatures, it is generally better to run the reaction over longer periods of time than to go to higher temperatures, even though they may be permissible.

The products may be worked up by washing, charcoaling, or extracting, and in some cases by crystallizing. In some cases, distillation is practical, particularly at low pressures, but often the reaction products are not separable by this means.

Typical preparations are shown in the following examples.

Example 1

As the first stage of this preparation, a diester was made by adding 246 grams of ethylene chlorohydrin to 137 grams of phosphorus trichloride during the course of ninety minutes while the temperature was held at 25° to 35° C. A light-colored oil formed which was heated on a boiling water bath under diminished pressure, yielding 192.5 grams of a colorless product. This material was distilled at 142°–143° C. at 3 mm. pressure. Some decomposition was evident as an odor like phosphine was noted. Analyses of the distillate showed the presence of 34.44% of chlorine and 14.70% of phosphorus. The corresponding values for $(ClC_2H_4O)_2POH$ are calculated as 34.25% and 14.98%, respectively.

There were taken forty-two grams of $$(ClC_2H_4O)_2POH$$

and six grams of paraformaldehyde powder added thereto. The mixture was left standing eight days, at which time practically all of the solid had been dissolved and reacted. The resulting product was taken up in a little ethylene chloride and the solution filtered to remove a slight turbidity. This solution was then heated at 100° C., the solvent taken off under reduced pressure, and a clear, yellowish oil obtained. By analysis, the oil corresponded in composition to $$(ClC_2H_4O)_2POCH_2OH$$

A small portion of this product was taken up in acetone and the acetone solution extended with water to give a solution containing 1% of $(ClC_2H_4O)_2POCH_2OH$. This solution was found to inhibit the growth of both *Macrosporium sarcinaeforme* Cav. and *Sclerotinia fructicola* in standard slide germination tests (cf. J. Phytopathology 33, 354). Solutions at 0.1% were toxic to *Macrosporium sarcinaeforme*.

A 1% solution was applied to cotton cloth by padding. The cloth was then dried and heated at 300° F. for twenty minutes. The resulting cloth was flame resistant or glow-proof.

Example 2

To 137 grams of phosphorus trichloride was added 403 grams of capryl alcohol (97%) during the course of twenty-three minutes. The reaction temperature was maintained below 40° C. by external cooling. The mixture was then stirred for one-half hour and diluted with benzene. The resulting solution was washed twice with two hundred gram portions of water, dried over sodium sulfate, and concentrated on a boiling water bath under reduced pressure. There was thus obtained 324 grams of a colorless oil, which corresponded in composition to $$(C_6H_{13}(CH_3)CHO)_2POH$$

A thirty gram portion of paraformaldehyde was stirred into the above diester, and the resulting mixture was stirred at 35° to 45° C. for thirty-nine hours. Unreacted solid was filtered off and amounted to 8.5 grams. The oil thus obtained contained 70% of $$(n{-}C_6H_{13}(CH_3)CHO)_2POCH_2OH$$

This product was found fungicidal in solution at 0.1% against *Macrosporium sarcinaeforme*. It was toxic to black bean aphids, Mexican bean beetles, and milkweed bugs. It was particularly effective against the confused flour beetle, a 5% dust in flour killing 91% of such beetles within twenty-four hours.

Example 3

By the procedures just illustrated, there may be formed methylol derivatives of other diesters of phosphorus acid. For example, in place of chlorohydrin used in Example 1, there may be used an equivalent weight of β-chloroethoxyethanol. Thus, 124 grams of diethylene glycol chlorohydrin was reacted with 137 grams of phosphorus trichloride below 40° C. and the reaction mixture treated as described above. There was thus obtained the diester, $(ClCH_2CH_2OCH_2CH_2O)_2POH$. To this was added thirty grams of paraformaldehyde. The reaction mixture was stirred at 40° C. for a day and left standing for a week. It was then stirred and heated for seven hours at 50°–60° C. There was thus obtained the methylol derivative. This product reacts with cellulose when heated therewith and prevents the cellulose from freely supporting combustion.

In the same way, other diesters may be formed and converted to the methylol derivative. Acetone cyanohydrin yields $$((CH_3)_2C(CN)O)_2POCH_2OH$$

allyl alcohol yields $(CH_2{=}CHCH_2O)_2POCH_2OH$; methallyl alcohol yields $$(CH_2{=}C(CH_3)CH_2O)_2POCH_2OH$$

dodecyl alcohol yields $(C_{12}H_{25}O)_2POCH_2OH$, and other alcohols yield corresponding diesters which are readily convertible to their methylol derivatives.

Example 4

There was first prepared the di-methallyl ester of phosphorous acid. This was done by mixing six moles of methallyl alcohol and four moles of pyridine in ethylene chloride as a solvent and slowly adding thereto two moles of phosphorus trichloride. The temperature was held below 45° C. by slow addition of the last reactant and by external cooling. Pyridine hydrochloride which separated out was filtered off and the filtrate heated under reduced pressure on a boiling water bath. There was obtained as a residue a clear residue which approached in composition the compound, $$(CH_2{=}C(CH_3)CH_2O)_2POH$$

A molar proportion of this compound was then mixed with slightly more than a mole of paraformaldehyde and warmed to 35°–40° C. The mixture was then left standing for seven days with occasional stirring. There was thus obtained a yellow oil which corresponded in composition to $(CH_2{=}C(CH_3)CH_2O)_2POCH_2OH$.

Special mention should be made of the esters having a monovalent haloaliphatic group for R, particularly those having two to six carbon atoms, such as $ClC_2H_4{-}$, $ClCH_2CH_2OCH_2CH_2{-}$, $ClCH_2CH_2OCH_2CH_2OCH_2CH_2{-}$, $BrCH_2CH_2{-}$ $BrCH_2CH_2OCH_2CH_2{-}$, $BrC_3H_7OC_3H_7{-}$ $ClCH_2CH(CH_3){-}$ $ClCH_2CH(CH_3)O(CH_3)CHCH_2{-}$, and the like. These are active fungicidally and are also useful as textile treating agents.

We claim:

1. Compounds of the formula $(RO)_2POCH_2OH$ wherein R is a member of the class consisting of aliphatic hydrocarbon groups of not over twelve carbon atoms, chloroalkyl and chloroalkoxyalkyl groups of two to six carbon atoms, and the chloroethoxyethoxyethyl group.

2. A compound of the formula (ClCH$_2$CH$_2$OCH$_2$CH$_2$O)$_2$POCH$_2$OH

3. A compound of the formula (ClCH$_2$CH$_2$O)$_2$POCH$_2$OH

W E CRAIG.
WILLIAM F. HESTER.

REFERENCES CITED

The following references are of record in the file of this patent:

UNITED STATES PATENTS

| Number | Name | Date |
|---|---|---|
| 1,936,985 | Lommel et al. | Nov. 28, 1933 |
| 2,169,185 | Shoemaker et al. | Aug. 8, 1939 |

OTHER REFERENCES

Beilstein, "Handbuch der Org. Chem.," vol. I, 4th ed. 1918, p. 337.

"Chemical Abstracts," vol. 13 (1919), pages 2865–66. Abstract of an article by Milobendzki et al., "Chemik Polski" vol. 15, 34–7 (1917).